US012747316B2

(12) United States Patent
Shih et al.

(10) Patent No.: US 12,747,316 B2
(45) Date of Patent: Sep. 29, 2026

(54) METHOD FOR MANUFACTURING NITRILE BUTADIENE RUBBER

(71) Applicant: NANTEX INDUSTRY CO., LTD., Kaohsiung City (TW)

(72) Inventors: Chun-Chuan Shih, Kaohsiung City (TW); Yen-Ju Chen, Kaohsiung City (TW); Hung-Yu Chen, Kaohsiung City (TW); Pen-Hsin Chou, Kaohsiung City (TW)

(73) Assignee: NANTEX INDUSTRY CO., LTD., Kaohsiung City (TW)

( * ) Notice: Subject to any disclaimer, the term of this patent is extended or adjusted under 35 U.S.C. 154(b) by 477 days.

(21) Appl. No.: 18/535,292

(22) Filed: Dec. 11, 2023

(65) Prior Publication Data

US 2025/0075019 A1 Mar. 6, 2025

(30) Foreign Application Priority Data

Sep. 1, 2023 (TW) ................................ 112133294

(51) Int. Cl.

| | |
|---|---|
| ***C08F 236/12*** | (2006.01) |
| ***C08K 5/09*** | (2006.01) |
| ***C08K 5/14*** | (2006.01) |
| ***C08K 5/37*** | (2006.01) |
| ***C08K 5/41*** | (2006.01) |
| ***C08K 13/00*** | (2006.01) |

(52) U.S. Cl.

CPC ............ *C08F 236/12* (2013.01); *C08K 13/00* (2013.01); *C08K 5/09* (2013.01); *C08K 5/14* (2013.01); *C08K 5/37* (2013.01); *C08K 5/41* (2013.01)

(58) Field of Classification Search

None

See application file for complete search history.

(56) References Cited

U.S. PATENT DOCUMENTS 5,447,992 A * 9/1995 Horvath .................... C08L 9/02
525/332.5
2012/0283351 A1* 11/2012 Klimpel .................. C08L 35/00
525/189

FOREIGN PATENT DOCUMENTS

CN 104250389 A * 12/2014 ................ C08L 9/02
CN 113754934 A * 12/2021 ................ C08L 9/02

OTHER PUBLICATIONS

CN 104250389 A, English translation Clarivate Analytics 2026. (Year: 2026).*
CN-113754934-A English translation Clarivate Analytics 2026. (Year: 2026).*

* cited by examiner

*Primary Examiner* — Christopher M Rodd
(74) *Attorney, Agent, or Firm* — MUNCY, GEISSLER, OLDS & LOWE, P.C.

(57) ABSTRACT

A method for manufacturing a nitrile butadiene rubber includes: subjecting a material composition containing water, butadiene, acrylonitrile, an emulsifying agent, an initiator, and a molecular weight regulator to an emulsion polymerization reaction, so as to form an emulsion; and adding a reactive antioxidant and a non-reactive antioxidant to the emulsion to form a mixture, followed by subjecting the mixture to a coagulation process, so as to form the nitrile butadiene rubber.

12 Claims, No Drawings

METHOD FOR MANUFACTURING NITRILE BUTADIENE RUBBER

CROSS-REFERENCE TO RELATED APPLICATION

This application claims priority to Taiwanese Invention patent application No. 112133294, filed on Sep. 1, 2023, and incorporated by reference herein in its entirety.

FIELD

The present disclosure relates to a method for manufacturing a rubber, and more particularly to a method for manufacturing a nitrile butadiene rubber.

BACKGROUND

Rubber hoses used in the automotive, aerospace, and oil field industries are required to transport high-temperature fluids such as hot fuel or hot air at various environmental temperatures, for example, high or low temperatures. Therefore, the rubber hoses need to be oil-resistant, high or low temperature-resistant and aging-resistant in order to maintain a certain level of physical and mechanical properties and service life.

The choice of rubber used affects the properties of the hoses produced using the rubber. For example, hoses made from nitrile butadiene rubber are widely used, and an acrylonitrile content in the nitrile butadiene rubber plays a significant role in determining the resultant robber hose's resistance to oil, tolerance for high and low temperatures, and ability to withstand aging. In general, increasing the acrylonitrile content in the nitrile butadiene rubber enhances the oil resistance and high-temperature tolerance of the rubber hoses while diminishing the low-temperature tolerance of the rubber hoses. In contrast, decreasing the acrylonitrile content in the nitrile butadiene rubber enhances the low-temperature tolerance but reduces the oil resistance and high-temperature tolerance of the rubber hoses.

CN 104250389 A discloses a method for manufacturing a nitrile butadiene rubber which includes adding an anti-deteriorant during the manufacturing process to form a rubber compound, so as to increase the heat and oil resistance of the nitrile butadiene rubber.

In spite of the aforesaid, there is still a need to develop an effective way for manufacturing a nitrile butadiene rubber, which can increase the heat and oil resistance of the nitrile butadiene rubber.

SUMMARY

Therefore, an object of the present disclosure is to provide a method for manufacturing a nitrile butadiene rubber, which can alleviate at least one of the drawbacks of the prior art.

According to the present disclosure, the method includes: subjecting a material composition containing water, butadiene, acrylonitrile, an emulsifying agent, an initiator, and a molecular weight regulator to an emulsion polymerization reaction, so as to form an emulsion; and adding a reactive antioxidant and a non-reactive antioxidant to the emulsion to form a mixture, followed by subjecting the mixture to a coagulation process, so as to form the nitrile butadiene rubber.

DETAILED DESCRIPTION

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a method for manufacturing a nitrile butadiene rubber, which includes subjecting a material composition containing water, butadiene, acrylonitrile, an emulsifying agent, an initiator, and a molecular weight regulator to an emulsion polymerization reaction, so as to form an emulsion, and adding a reactive antioxidant and a non-reactive antioxidant to the emulsion to form a mixture, followed by subjecting the mixture to a coagulation process, so as to form the nitrile butadiene rubber.

As used herein, the term "reactive antioxidant" refers to any antioxidant with one or more polymerizable functional groups. In certain embodiments, the reactive antioxidant is selected from the group consisting of N-(4-anilinophenyl)-methacrylamide (NAPM, CAS no. 41543-92-4), N-(4-anilinophenyl)maleimide (CAS no. 32099-65-3), 2-hydroxyethyl methacrylate phosphate (HEMAP, CAS no. 52628-03-2), and combinations thereof. In certain embodiments, the reactive antioxidant is present in an amount ranging from 0.2 parts by weight to 3 parts by weight, based on a total weight of the butadiene and the acrylonitrile as 100 parts by weight.

As used herein, the term "non-reactive antioxidant" refers to any antioxidant without a polymerizable functional group. In certain embodiments, the non-reactive antioxidant is selected from the group consisting of 2-mercaptobenzimidazole zinc salt (ZMBI, CAS no. 3030-80-6), 2-mercaptobenzimidazole (MBI, CAS no. 583-39-1), methyl-2-mercaptobenzimidazole (MMBI, CAS no. 53988-10-6), and combinations thereof. In certain embodiments, the non-reactive antioxidant is present in an amount ranging from 0.2 parts by weight to 3 parts by weight, based on a total weight of the butadiene and the acrylonitrile as 100 parts by weight.

To be specific, by virtue of adding both the reactive antioxidant and the non-reactive antioxidant to the emulsion formed from the emulsion polymerization reaction to form the mixture, followed by subjecting the mixture to the coagulation process, the nitrile butadiene rubber prepared from the method of the present disclosure can exhibit excellent oil resistance and heat resistance. Therefore, according to the present disclosure, the quantities of the butadiene and the acrylonitrile, the amount of water, the types and the quantities of the emulsifying agent, the initiator, and the molecular weight regulator, as well as the operating conditions for the emulsion polymerization reaction and the coagulation process are not specifically limited and may be well-known to those skilled in the art. In an exemplary embodiment, the coagulation process may be performed by mixing the mixture with a 1.8 wt % calcium chloride solution to allow the mixture to undergo the coagulation process, resulting in precipitation of the nitrile butadiene rubber.

According to the present disclosure, a weight ratio of the butadiene to the acrylonitrile may range from 55:45 to 75:25. In certain embodiments, the weight ratio of the butadiene to the acrylonitrile is 55:45.

According to the present disclosure, the water is present in an amount ranging from 180 parts by weight to 220 parts by weight, based on a total weight of the butadiene and the acrylonitrile as 100 parts by weight.

According to the present disclosure, the emulsifying agent is selected from the group consisting of hydrogenated tallow fatty acid (HTFA, CAS no. 61790-38-3), sodium dodecyl sulfate (SDS, CAS no. 151-21-3), sodium dodecyl benzene sulfonate (CAS no. 15163-46-9), disproportionated rosin, and combinations thereof. The emulsifying agent may be present in an amount ranging from 1.5 parts by weight to 4 parts by weight, based on a total weight of the butadiene and the acrylonitrile as 100 parts by weight. In an exemplary embodiment, the emulsifying agent is hydrogenated tallow fatty acid, which is present in the amount of 2.5 parts by weight, based on the total weight of the butadiene and the acrylonitrile as 100 parts by weight.

According to the present disclosure, the initiator is selected from the group consisting of cumyl hydroperoxide (CHP, CAS no. 80-15-9), dicumyl peroxide (DCP, CAS no. 80-43-3) and a combination thereof. The initiator may be present in an amount ranging from 0.03 parts by weight to 0.15 parts by weight, based on a total weight of the butadiene and the acrylonitrile as 100 parts by weight. In an exemplary embodiment, the initiator is cumyl hydroperoxide, which is present in the amount of 0.07 parts by weight, based on the total weight of the butadiene and the acrylonitrile as 100 parts by weight.

According to the present disclosure, the molecular weight regulator is selected from the group consisting of tert-dodecylthiol (TDM, CAS no. 25103-58-6), 1-dodecanethiol (NDM, CAS no. 112-55-0), and a combination thereof. The molecular weight regulator may be present in an amount ranging from 0.2 parts by weight to 1.0 part by weight, based on a total weight of the butadiene and the acrylonitrile as 100 parts by weight. In an exemplary embodiment, the molecular weight regulator is tert-dodecylthiol, which is present in the amount of 0.55 parts by weight, based on the total weight of the butadiene and the acrylonitrile as 100 parts by weight.

The disclosure will be further described by way of the following examples. However, it should be understood that the following examples are solely intended for the purpose of illustration and should not be construed as limiting the disclosure in practice.

EXAMPLES

Example 1 (EX1)

A material composition including 210 parts by weight of water, 55 parts by weight of butadiene, 45 parts by weight of acrylonitrile, 2.5 parts by weight of hydrogenated tallow fatty acid (HTFA), 0.07 parts by weight of cumyl hydroperoxide (CHP), and 0.55 parts by weight of tert-dodecylthiol (TDM) was subjected to an emulsion polymerization reaction at a temperature of 10° C. until the conversion rate reached 85%, followed by adding an appropriate amount of hydroxylamine sulfate (serving as a terminator, CAS no. 10039-54-0) to stop the emulsion polymerization reaction, so as to form an emulsion. Afterwards, 1 part by weight of N-(4-anilinophenyl)-methacrylamide (serving as a reactive antioxidant, NAPM) and 1 part by weight of 2-mercaptobenzimidazole zinc salt (serving as a non-reactive antioxidant, ZMBI) were added to the emulsion to form a mixture. Next, the mixture was mixed with a 1.8 wt % calcium chloride (CAS no. 10043-52-4) solution to allow the mixture to undergo a coagulation process, resulting in precipitation of a nitrile butadiene rubber, followed by subjecting the nitrile butadiene rubber to a drying treatment, so as to form a nitrile butadiene rubber of EX1.

Comparative Example 1 (CE1)

The procedures for manufacturing the nitrile butadiene rubber of CE1 were similar to those of EX1, except that 1 part by weight of NAPM was added to the emulsion without adding ZMBI to form the mixture of CE1.

Comparative Example 2 (CE2)

1.5 parts by weight of NAPM and a material composition including 210 parts by weight of water, 53.5 parts by weight of butadiene, 45 parts by weight of acrylonitrile, 2.5 parts by weight of HTFA, 0.07 parts by weight of CHP, and 0.55 parts by weight of TDM were mixed and then subjected to an emulsion polymerization reaction at a temperature of 10° C. until the conversion rate reached 85%, followed by adding an appropriate amount of hydroxylamine sulfate (serving as a terminator) to stop the emulsion polymerization reaction, so as to form an emulsion. Afterwards, the emulsion was mixed with a 1.8 wt % calcium chloride (CAS no. 10043-52-4) solution to allow the emulsion to undergo a coagulation process, resulting in precipitation of a grafted nitrile butadiene rubber, followed by subjecting the grafted nitrile butadiene rubber to a drying treatment, so as to form a grafted nitrile butadiene rubber of CE2.

Comparative Example 3 (CE3)

100 parts by weight of a commercially available nitrile butadiene rubber (Nancar®, Cat. no. 4155, acrylonitrile content: 41 wt %), 1 part by weight of NAPM, and 1 part by weight of ZMBI were subjected to a mixing process at a temperature of 50° C. using an open mill (Manufacturer: Yi Tzung Precision Machinery Corp., Model no.: MLI-2-1), so as to form a nitrile butadiene rubber compound of CE3.

Blank Control Group (BCG)

The commercially available nitrile butadiene rubber (Nancar®, Cat. no. 4155, acrylonitrile content: 41 wt %), which does not contain NAPM and ZMBI, was used as a blank control group.

The types and amounts of antioxidants (i.e., NAPM and ZMBI) used for making the nitrile butadiene rubbers of EX1 and CE1, the grafted nitrile butadiene rubber of CE2, and the nitrile butadiene rubber compound of CE3 are summarized in Table 1 below.

TABLE 1

| | NAPM amount (part by weight) | ZMBI amount (part by weight) | Addition of NAPM and/or ZMBI |
|---|---|---|---|
| EX1 | 1.0 | 1.0 | NAPM and ZMBI were added to the emulsion to form the mixture, followed by subjecting the mixture to the coagulation process |

TABLE 1-continued

| | NAPM amount (part by weight) | ZMBI amount (part by weight) | Addition of NAPM and/or ZMBI |
|---|---|---|---|
| CE1 | 1.0 | 0 | NAPM was added to the emulsion to form the mixture, followed by subjecting the mixture to the coagulation process |
| CE2 | 1.5 | 0 | NAPM was added to the material composition for the emulsion polymerization reaction |
| CE3 | 1.0 | 1.0 | NAPM and ZMBI were added to the commercially available nitrile butadiene rubber for the mixing process |
| BCG | 0 | 0 | Not added |

Property Evaluation

A. Preparation of Dumbbell Specimen

The dumbbell specimen of each of EX1, CE1 to CE3, and BCG was prepared in accordance with ASTM D-3187 (published in 2006). Briefly, a respective one of 100 parts by weight of the nitrile butadiene rubber of each of EX1 and CE1, the grafted nitrile butadiene rubber of CE2, the nitrile butadiene rubber compound of CE3, and the commercially available nitrile butadiene rubber of BCG was mixed with 3 parts by weight of zinc oxide, 1 part by weight of stearic acid, 1.5 parts by weight of surface-modified sulfur (i.e., sulfur particles coated with 2% magnesium carbonate), 0.7 parts by weight of N-tert-butyl-2-benzothiazolesulfenamide (TBBS, serving as a promoter), and 40 parts by weight of carbon black, and then subjected to a vulcanization reaction using the open mill (Manufacturer: Yi Tzung Precision Machinery Corp., Model no.: MLI-2-1), so as to obtain a sheet material. Subsequently, the sheet material of each of EX1, CE1 to CE3, and BCG was left to stand at room temperature (i.e., 25° C.) until the sheet material cooled to room temperature, and then was cut into multiple specimens with dimensions of 150 mm×150 mm×2 mm, followed by placing the multiple specimens in an environment having a temperature of 150° C. for 40 minutes to allow the multiple specimens to undergo a vulcanization reaction, so as to form multiple vulcanized specimens. Finally, each of the vulcanized specimens was cut into a dumbbell specimen and the distance between the two cutting edges of the dumbbell specimen was 6 mm.

B. Measurement of Acrylonitrile Content

Acrylonitrile content was measured in accordance with ISO 3900 (published in 1995). Briefly, the nitrile butadiene rubber of each of EX1 and CE1, the grafted nitrile butadiene rubber of CE2, the nitrile butadiene rubber compound of CE3, and the commercially available nitrile butadiene rubber of BCG were subjected to determination of nitrogen content using Kjeldahl method, followed by converting the thus obtained nitrogen content into the acrylonitrile content. The results are shown in Table 2 below.

C. Measurement of Mooney Viscosity

The nitrile butadiene rubber of each of EX1 and CE1, the grafted nitrile butadiene rubber of CE2, the nitrile butadiene rubber compound of CE3, and the commercially available nitrile butadiene rubber of BCG were subjected to determination of Mooney viscosity (ML1+4, 100° C.) using a Mooney viscometer (Manufacturer: ALPHA, Model no.: MV-2000) in accordance with ASTM D1646 (published in 2006). The results are shown in Table 2 below.

D. Measurement of Tear Strength Before Aging

One dumbbell specimen of each of EX1, CE1 to CE3, and BCG prepared in section A of "Property evaluation" was subjected to determination of tear strength using a tensile tester (Manufacturer: Instron, Model no.: 3365) in accordance with ASTM D412 (published in 2009), so as to obtain the tear strength before aging. The results are shown in Table 2 below.

E. Measurement of Tensile Strength at Break and Percentage Change in Tensile Strength at Break One dumbbell specimen of each of EX1, CE1 to CE3, and BCG prepared in section A of "Property evaluation" was subjected to determination of tensile strength at break using the tensile tester in accordance with ASTM D412 (published in 2009), so as to obtain the tensile strength at break before aging. The results are shown in Table 2 below.

For each of EX1, CE1 to CE3, and BCG, three dumbbell specimens (i.e., a first dumbbell specimen, a second dumbbell specimen and a third dumbbell specimen) prepared in section A of "Property evaluation" were respectively subjected to aging conditions as follows: (1) placing the first dumbbell specimen in a test tube containing IRM 901 testing oil, followed by placing the test tube in an oven (Manufacturer: GOTECH, Model no.: GT-7024) at a temperature of 130° C. for 70 hours to allow the first dumbbell specimen to undergo an aging process; (2) placing the second dumbbell specimen in a test tube containing IRM 903 testing oil, followed by placing the test tube in the oven at a temperature of 130° C. for 70 hours to allow the second dumbbell specimen to undergo an aging process; and (3) placing the third dumbbell specimen in a test tube filled with air, followed by placing the test tube in the oven at a temperature of 130° C. for 70 hours to allow the third dumbbell specimen to undergo an aging process. After completing the aforesaid aging process, each of the three aged dumbbell specimens was left to stand at room temperature (i.e., 25° C.) until the aged dumbbell specimens cooled to room temperature. Afterwards, each of the three aged dumbbell specimens of the respective one of EX1, CE1 to CE3, and BCG was subjected to determination of tensile strength at break using the tensile tester in accordance with ASTM D412 (published in 2009), so as to obtain the tensile strength at break after aging. The results are shown in Table 2 below.

The percentage change in tensile strength at break under each aging condition of the respective one of EX1, CE1 to CE3, and BCG was calculated by substituting the thus obtained tensile strength at break before aging and tensile strength at break after aging into the following Equation (1):

$$A = [(B - C)/C] \times 100\% \quad (1)$$

where A=percentage change in tensile strength at break (%)

B=tensile strength at break after aging for the respective one of EX1, CE1 to CE3, and BCG C=tensile strength at break before aging for the respective one of EX1, CE1 to CE3, and BCG F. Measurement of Elongation at Break and Percentage Change in Elongation at Break One dumbbell specimen of each of EX1, CE1 to CE3, and BCG prepared in section A of "Property evaluation" was subjected to determination of elongation at break using the tensile tester in accordance with ASTM D412 (published in 2009), so as to obtain the elongation at break before aging. The results are shown in Table 2 below.

For each of EX1, CE1 to CE3, and BCG, three dumbbell specimens (i.e., a first dumbbell specimen, a second dumbbell specimen and a third dumbbell specimen) prepared in section A of "Property evaluation" were respectively subjected to aging conditions as follows: (1) placing the first dumbbell specimen in a test tube containing IRM 901 testing oil, followed by placing the test tube in the oven at a temperature of 130° C. for 70 hours to allow the first dumbbell specimen to undergo an aging process; (2) placing the second dumbbell specimen in a test tube containing IRM 903 testing oil, followed by placing the test tube in the oven at a temperature of 130° C. for 70 hours to allow the second dumbbell specimen to undergo an aging process; and (3) placing the third dumbbell specimen in a test tube filled with air, followed by placing the test tube in the oven at a temperature of 130° C. for 70 hours to allow the third dumbbell specimen to undergo an aging process. After completing the aforesaid aging process, each of the three aged dumbbell specimens was left to stand at room temperature (i.e., 25° C.) until the aged dumbbell specimens cooled to room temperature. Afterwards, each of the three aged dumbbell specimens of the respective one of EX1, CE1 to CE3, and BCG was subjected to determination of elongation at break using the tensile tester in accordance with ASTM D412 (published in 2009), so as to obtain the elongation at break after aging. The results are shown in Table 2 below.

The percentage change in elongation at break under each aging condition of the respective one of EX1, CE1 to CE3, and BCG was calculated by substituting the thus obtained elongation at break before aging and elongation at break after aging into the following Equation (2):

$$D = [(E-F)/F] \times 100\% \quad (2)$$

where D=percentage change in elongation at break (%)

E=elongation at break after aging for the respective one of EX1, CE1 to CE3, and BCG F=elongation at break before aging for the respective one of EX1, CE1 to CE3, and BCG G. Measurement of Percentage Change in Volume One vulcanized specimen of each of EX1, CE1 to CE3, and BCG prepared in section A of "Property evaluation" was subjected to determination of volume in accordance with ISO 1817 (published in 1999), so as to obtain the volume before aging. The results are shown in Table 2 below.

For each of EX1, CE1 to CE3, and BCG, two vulcanized specimens (i.e., a first vulcanized specimen and a second vulcanized specimen) prepared in section A of "Property evaluation" were respectively subjected to aging conditions as follows: (1) placing the first vulcanized specimen in a test tube containing IRM 901 testing oil, followed by placing the test tube in the oven at a temperature of 130° C. for 70 hours to allow the first vulcanized specimen to undergo an aging process; and (2) placing the second vulcanized specimen in a test tube containing IRM 903 testing oil, followed by placing the test tube in the oven at a temperature of 130° C. for 70 hours to allow the second vulcanized specimen to undergo an aging process. After completing the aforesaid aging process, each of the two aged vulcanized specimens was left to stand at room temperature (i.e., 25° C.) until the aged vulcanized specimens cooled to room temperature. Afterwards, each of the two aged vulcanized specimens of the respective one of EX1, CE1 to CE3, and BCG was subjected to determination of volume in accordance with ISO 1817 (published in 1999), so as to obtain the volume after aging. The results are shown in Table 2 below.

The percentage change in volume under each aging condition of the respective one of EX1, CE1 to CE3, and BCG was calculated by substituting the thus obtained volume before aging and volume after aging into the following Equation (3):

$$G = [(H-I)/I] \times 100\% \quad (3)$$

where G=percentage change in volume (%)

H=volume after aging for the respective one of EX1, CE1 to CE3, and BCG

I=volume before aging for the respective one of EX1, CE1 to CE3, and BCG

Results

TABLE 2

| | | EX1 | CE1 | CE2 | CE3 | BCG |
|---|---|---|---|---|---|---|
| Rubber properties | Acrylonitrile content (wt %) | 40.6 | 41.0 | 40.9 | 41 | 41 |
| | Mooney viscosity | 52 | 54 | 51 | 51 | 51 |
| Properties before aging | Tensile strength at break ($kgf/cm^2$) | 304 | 304 | 279 | 298 | 301 |
| | Elongation at break (%) | 561 | 574 | 493 | 529 | 517 |
| | Tear strength (kgf/cm) | 59 | 57 | 53 | 56 | 58 |
| Properties after aging | Aging condition: each of the dumbbell specimens or vulcanized specimens was immersed in IRM 901 testing oil at a temperature of 130° C. for 70 hours | | | | | |
| | Percentage change in tensile strength at break (%) | −16 | −25 | −20 | −20 | −33 |
| | Percentage change in elongation at break (%) | −35 | −42 | −40 | −41 | −47 |
| | Percentage change in volume (%) | −0.39 | −0.4 | −0.48 | −0.4 | −0.19 |
| | Aging condition: each of the dumbbell specimens or vulcanized specimens was immersed in IRM 903 testing oil at a temperature of 130° C. for 70 hours | | | | | |
| | Percentage change in tensile strength at break (%) | −24 | −42 | −40 | −30 | −51 |
| | Percentage change in elongation at break (%) | −33 | −40 | −41 | −38 | −46 |
| | Percentage change in | 6.93 | 8.96 | 8.7 | 8.7 | 9.7 |

TABLE 2-continued

| | EX1 | CE1 | CE2 | CE3 | BCG |
|---|---|---|---|---|---|
| volume (%) | | | | | |
| Aging condition: each of the dumbbell specimens was exposed to air at a temperature of 130° C. for 70 hours | | | | | |
| Percentage change in tensile strength at break (%) | −26 | −39 | −39 | −34 | −60 |
| Percentage change in elongation at break (%) | −56 | −61 | −62 | −60 | −76 |

Referring to Table 1 in conjunction with Table 2, regardless of the aging conditions, compared with CE1 to CE3, the nitrile butadiene rubber of EX1 consistently exhibited smaller absolute values of the percentage changes in tensile strength at break, elongation at break, and volume, which were determined before and after aging. These results demonstrate that the nitrile butadiene rubber of EX1 can exhibit excellent oil resistance and heat resistance by means of adding NAPM and ZMBI to the emulsion formed from the emulsion polymerization reaction to form the mixture, followed by subjecting the mixture to the coagulation process.

Summarizing the above test results, it is clear that the nitrile butadiene rubber manufactured by the method for manufacturing the nitrile butadiene rubber of the present disclosure exhibits excellent oil resistance and heat resistance even under rigorous aging conditions, and hence can effectively maintain a certain level of physical and mechanical properties and service life.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for manufacturing a nitrile butadiene rubber, comprising:

subjecting a material composition including water, butadiene, acrylonitrile, an emulsifying agent, an initiator, and a molecular weight regulator to an emulsion polymerization reaction, so as to form an emulsion; and adding a reactive antioxidant and a non-reactive antioxidant to the emulsion to form a mixture, followed by subjecting the mixture to a coagulation process, so as to form the nitrile butadiene rubber.

2. The method as claimed in claim 1, wherein the reactive antioxidant is selected from the group consisting of N-(4-anilinophenyl)-methacrylamide (NAPM), N-(4-anilinophenyl)maleimide, 2-hydroxyethyl methacrylate phosphate (HEMAP), and combinations thereof.

3. The method as claimed in claim 1, wherein the reactive antioxidant is present in an amount ranging from 0.2 parts by weight to 3 parts by weight, based on a total weight of the butadiene and the acrylonitrile as 100 parts by weight.

4. The method as claimed in claim 1, wherein the non-reactive antioxidant is selected from the group consisting of 2-mercaptobenzimidazole zinc salt (ZMBI), 2-mercaptobenzimidazole (MBI), methyl-2-mercaptobenzimidazole (MMBI), and combinations thereof.

5. The method as claimed in claim 1, wherein the non-reactive antioxidant is present in an amount ranging from 0.2 parts by weight to 3 parts by weight, based on a total weight of the butadiene and the acrylonitrile as 100 parts by weight.

6. The method as claimed in claim 1, wherein a weight ratio of the butadiene to the acrylonitrile ranges from 55:45 to 75:25.

7. The method as claimed in claim 1, wherein the emulsifying agent is present in an amount ranging from 1.5 parts by weight to 4 parts by weight, based on a total weight of the butadiene and the acrylonitrile as 100 parts by weight.

8. The method as claimed in claim 1, wherein the initiator is present in an amount ranging from 0.03 parts by weight to 0.15 parts by weight, based on a total weight of the butadiene and the acrylonitrile as 100 parts by weight.

9. The method as claimed in claim 1, wherein the molecular weight regulator is present in an amount ranging from 0.2 parts by weight to 1.0 part by weight, based on a total weight of the butadiene and the acrylonitrile as 100 parts by weight.

10. The method as claimed in claim 1, wherein the emulsifying agent is selected from the group consisting of hydrogenated tallow fatty acid (HTFA), sodium dodecyl sulfate (SDS), sodium dodecyl benzene sulfonate, disproportionated rosin, and combinations thereof.

11. The method as claimed in claim 1, wherein the initiator is selected from the group consisting of cumyl hydroperoxide (CHP), dicumyl peroxide (DCP), and a combination thereof.

12. The method as claimed in claim 1, wherein the molecular weight regulator is selected from the group consisting of tert-dodecylthiol (TDM), 1-dodecanethiol (NDM), and a combination thereof.

* * * * *